United States Patent
Luinge et al.

(10) Patent No.: US 8,981,904 B2
(45) Date of Patent: Mar. 17, 2015

(54) COMPRESSION OF IMU DATA FOR TRANSMISSION OF AP

(75) Inventors: Hendrik Johannes Luinge, Enschede (NL); Giovanni Bellusci, Hengelo (NL); Freerk Dijkstra, Hengelo (NL)

(73) Assignee: Xsens Holding B.V., Enschede (NL)

( * ) Notice: Subject to any disclaimer, the term of this patent is extended or adjusted under 35 U.S.C. 154(b) by 612 days.

(21) Appl. No.: 13/431,584

(22) Filed: Mar. 27, 2012

(65) Prior Publication Data
US 2012/0223846 A1 Sep. 6, 2012

Related U.S. Application Data

(63) Continuation-in-part of application No. 12/940,420, filed on Nov. 5, 2010, now Pat. No. 8,947,206.

(30) Foreign Application Priority Data

Nov. 6, 2009 (EP) .................................... 09175290

(51) Int. Cl.
*H04Q 9/00* (2006.01)
*G01C 21/16* (2006.01)

(52) U.S. Cl.
CPC .............. *H04Q 9/00* (2013.01); *G01C 21/165* (2013.01); *G01C 21/16* (2013.01); *H04Q 2209/84* (2013.01); *H04Q 2209/823* (2013.01); *H04Q 2209/88* (2013.01)
USPC ......................................................... 340/8.1

(58) Field of Classification Search
CPC ...... G01C 21/16; G01C 21/165; G01C 21/18; G01S 19/00–19/55
See application file for complete search history.

(56) References Cited

U.S. PATENT DOCUMENTS 6,125,325 A * 9/2000 Kohli .............................. 701/466
6,409,687 B1 * 6/2002 Foxlin ........................... 600/595
(Continued)

FOREIGN PATENT DOCUMENTS

WO   WO-2006/041891   4/2006
WO   WO-2008/088145   7/2008

OTHER PUBLICATIONS

Swiss Transport Research Conference; "Calculation of Displacements of Measured Accelerations, Analysis of Two Accelerometers and Application in road Engineering"; Martin Arraigada, Empa, Road Engineering/Sealing Comp.; Manfred Partl, Empa Road Engineering/Sealing Comp.; Conference Paper STRC, Mar. 15-17, 2006.
(Continued)

*Primary Examiner* — Hai Phan
*Assistant Examiner* — Orlando Bousono
(74) *Attorney, Agent, or Firm* — Miller, Matthias & Hull LLP (57) ABSTRACT

A method, controller and system in accordance with various aspects of the present disclosure facilitate reduced energy consumption in a motion sensing device having an inertial measurement unit (IMU), with a strap down integration unit, and an application processing unit (AP). The system and method include rounding velocity increments and orientation increments at the inertial measurement unit, thereby producing a remainder values. The remainder values are added to subsequent velocity increments and orientation increments prior to rounding of those values, and so on. In this way, while motion granularity is slightly decreased, there is no drift of integration errors over time.

9 Claims, 9 Drawing Sheets

(56) References Cited

U.S. PATENT DOCUMENTS

| | | | |
|---|---|---|---|
| 6,415,223 B1* | 7/2002 | Lin et al. | 701/431 |
| 6,459,990 B1* | 10/2002 | McCall et al. | 701/501 |
| 6,477,465 B1* | 11/2002 | McCall et al. | 701/501 |
| 6,522,992 B1* | 2/2003 | McCall et al. | 702/141 |
| 2001/0045128 A1* | 11/2001 | McCall et al. | 73/511 |
| 2002/0008661 A1* | 1/2002 | McCall et al. | 342/357.14 |
| 2002/0015439 A1* | 2/2002 | Kohli et al. | 375/148 |
| 2002/0065626 A1* | 5/2002 | McCall et al. | 702/141 |
| 2002/0077768 A1* | 6/2002 | McCall et al. | 702/141 |
| 2002/0107658 A1* | 8/2002 | McCall et al. | 702/141 |
| 2002/0135414 A1* | 9/2002 | McCall et al. | 327/307 |
| 2002/0135420 A1* | 9/2002 | McCall et al. | 330/68 |
| 2002/0183958 A1* | 12/2002 | McCall et al. | 702/141 |
| 2003/0105588 A1* | 6/2003 | Lin et al. | 702/1 |
| 2003/0114984 A1* | 6/2003 | Scherzinger | 701/216 |
| 2003/0176970 A1* | 9/2003 | Lin | 701/214 |
| 2005/0264429 A1 | 12/2005 | Hermary et al. | |
| 2006/0100781 A1* | 5/2006 | Lin et al. | 701/216 |
| 2006/0265120 A1* | 11/2006 | Coleman et al. | 701/209 |
| 2007/0032951 A1* | 2/2007 | Tanenhaus et al. | 701/220 |
| 2007/0057842 A1* | 3/2007 | Coleman et al. | 342/359 |
| 2009/0192751 A1 | 7/2009 | Kamath et al. | |
| 2009/0259709 A1* | 10/2009 | Nikitin | 708/801 |
| 2009/0326740 A1* | 12/2009 | Wang | 701/3 |
| 2009/0326851 A1* | 12/2009 | Tanenhaus | 702/96 |
| 2010/0121572 A1* | 5/2010 | Berardi et al. | 701/216 |

OTHER PUBLICATIONS

"Attitude Estimation by Compensating Gravity Direction" Lekskulchai Pongsak, et al. Department of Mechano-Informatics, The University of Tokyo 7-3-1 Hongo Bunkyo-ku, Tokyo 113-8656 Japan Nomura Research Institute CREST Program, Japan Science and Technology Corporation, Sep. 20-22, 2003.

European search Report issued on Sep. 8, 2013 for Corresponding Application No. 13161077.6.

Search Report from related European Application No. EP 09175290.7; report dated Dec. 29, 2009; 8 pages.

* cited by examiner

COMPRESSION OF IMU DATA FOR TRANSMISSION OF AP

RELATED APPLICATION

This application is a continuation in part of U.S. application Ser. No. 12/940,420 filed on Nov. 5, 2010, and entitled "Method and a System for Enabling a Wireless Communication Between a Master Unit and a Sensor Unit," which claims priority to European Patent Application 09175290.7 filed Nov. 6, 2009, the entirety of both applications being herein incorporated by reference for all that they teach without exclusion of any part.

TECHNICAL FIELD OF THE DISCLOSURE

The present disclosure relates to communications between an inertial measurement unit (IMU) and an application processor (AP) and, more particularly, relates to compression of motion data for transmission between the IMU and AP.

BACKGROUND OF THE DISCLOSURE

The accurate recording or analysis of any movement requires, first and foremost, that the movement be accurately sensed. This was the basis for early navigational tools such as the magnetic compass and the astrolabe, and it remains true today. Moreover, while tools such as the compass and astrolabe require external sources of reference to determine motion, it is sometimes necessary to determine motion internally, i.e., via inertial measurements alone.

Early inertial measurement systems required that the sensing elements be isolated from the surrounding environment via complex and troublesome gimbaled or fluid-suspended gyro-stabilized platforms. However, advances in electronics and micro devices have facilitated a variety of inertial sensor system known as a strap-down system (sometimes referred to as a Strap-Down Integration system or Strap-Down Inertial system, both abbreviated "SDI").

Figure 1:
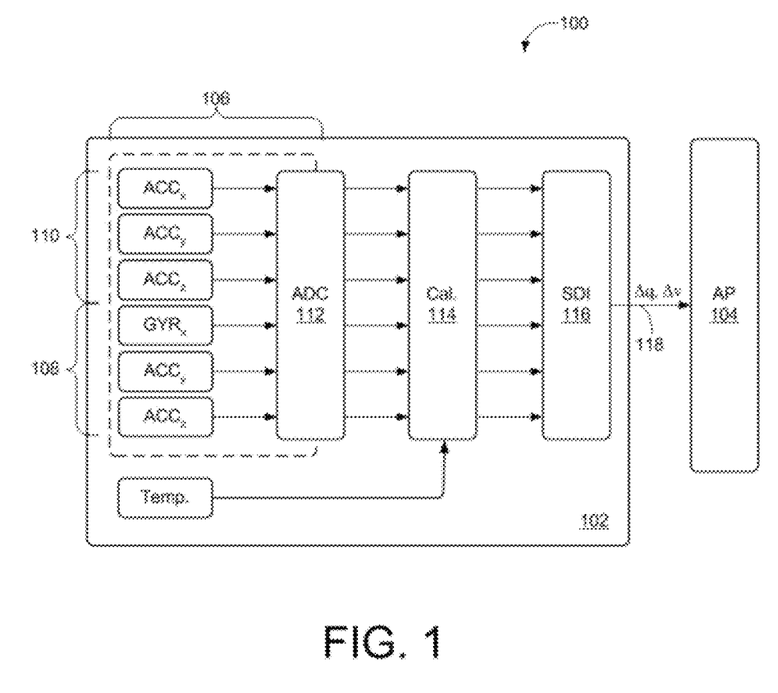
FIG. 1 is a schematic diagram of an ordinary SDI configuration.

A typical SDI system contains two primary components, namely an inertial measurement unit (IMU) and an application processor (AP). A typical architecture 100 based on these components is shown in FIG. 1. The illustrated system 100 contains the IMU 102 and the AP 104 with a number of sub-elements within the IMU 102. These include an analog section 106 having a number of gyroscopic sensors 108 and acceleration sensors 110 (accelerometers) providing input to an analog-to-digital converter 112 (ADC). The ADC 112 periodically samples the sensors 108, 110 and digitizes their values for calibration adjustment through a calibration module 114. Calibration may be based on environmental factors, such as a temperature value from temperature sensor 115, or otherwise. Finally, within the IMU 102, the digitized and calibrated values are provided to the SDI unit 116 for integration.

In order to prevent aliasing, coning and sculling, which may be caused by vibration or shocks, the sampling frequency at the analog side of the ADC 112 must typically be high. Thus, in most state-of-the-art IMUs, the analog sensing elements are sampled at a rate of a few kHz, e.g., 2-4 kHz. However, transmitting this raw data to the AP 104 via the link 118 requires the link 118 to have a very high bandwidth. Moreover, the actual update rate required by an application using the data may be lower. For example, an update rate of 24 Hz may be sufficient if the output is streamed to screen, and an update rate as low as 1 Hz may be sufficient for pedestrian navigation guidance applications. Therefore, the SDI unit 116 may combine a number of samples to determine the increment in the angle and velocity ($\Delta q$ and $\Delta v$ respectively). The processed values are then transmitted over a link 118 to the AP 104.

Where the sample rate is implemented in hardware, the SDI rate is defined by the number of integrated samples and the update rate by the number of SDI frames. In most devices, the SDI rate is the same as the update rate. On professional grade IMUs there are typically no buffers implemented since the AP using such devices should always have the time or be configured to handle the data and/or buffers are implemented sufficiently on the receive side, e.g. by implementing the communication using direct memory access (DMA) in which data points are stored in memory without involving the AP.

For consumer grade mobile devices, power consumption is a significant concern, and so power management is typically achieved by lowering the update rate of the IMU and switching the processor to a low-power or sleep-mode, to occasionally 'wake-up' and handle data from the sensors. As such digital IMUs integrated in mobile devices often use an onboard FIFO memory structure to store their data and have it ready for the processor to fetch it in a single burst.

However, the described current state-of-the-art architecture for mobile devices using consumer grade IMUs exhibits two substantial problems, namely excessively low update rate and buffer overflow. With respect to the update rate, to preserve power, typically the update rate at the mobile device will be as low as possible. This also might be implemented in hardware by limiting the bandwidth (i.e. lowering the clock) of the communication line, thereby effectively making it impossible to send data at higher update rates. With respect to buffer overflow when strap down integration is implemented, the buffer of the IMU may overflow when the AP is too busy to read out the buffer or when the bus is too full with other communication.

The described system and method allow flexibility in fitting the output format representation of motion increments to the specific demands of e.g. higher level protocols, without sacrificing integral accuracy. This is beneficial since motion increments typically require higher number of bits of resolution (e.g. from 16 to 32) to preserve accuracy. Such a high number of bits may be undesirable or simply unacceptable, e.g. to maintain compliance with pre-existing data packet format. Thus, the present disclosure is directed to a system and method for addressing some or all of the above difficulties; however, it should be appreciated that the solution of any particular problem is not a limitation on the scope of this disclosure or of the attached claims, except to the extent expressly noted.

Additionally, this background section discusses problems and solutions noted by the inventors; the inclusion of any problem or solution in this section is not an indication that the problem or solution represents known prior art except as otherwise expressly noted. With respect to prior art that is expressly noted as such, the summary thereof is not intended to alter or supplement the prior art document itself; any discrepancy or difference should be resolved by reference to the prior art.

SUMMARY OF THE DISCLOSURE

In accordance with one aspect of the present disclosure, a system and method are provided for reducing energy usage in a motion sensing device having an inertial measurement unit, with a strap down integration unit, and an application processing unit. The disclosed technique includes A method, controller and system in accordance with various aspects of the present disclosure facilitate reduced energy consumption in a motion sensing device having an inertial measurement unit (IMU), with a strap down integration unit, and an application processing unit (AP). The system and method include rounding velocity increments and orientation increments at the inertial measurement unit, thereby producing a remainder values. The remainder values are added to subsequent velocity increments and orientation increments prior to rounding of those values, and so on. In this way, while motion granularity is slightly decreased, there is no drift of integration errors over time.

In an embodiment, the remainder values are delayed by one output sample period prior to the step of combining. In a further embodiment, a variable quantization step is applied during rounding, e.g., by rounding smaller increments with a finer resolution than larger increments.

A signal pre-conditioning transformation may be applied to motion increments, and may include applying a transformation curve such that the values of the motion increments are variably compressed according to the curve. The rounded increments may be mapped prior to transmission using variable length coding. Additionally or alternatively, a predicative algorithm may be applied to the rounded values to compress them for transmission.

Additional and alternative features and aspects of the disclosed methods and systems will become apparent from reading the detailed specification in conjunction with the included drawing figures.

DETAILED DESCRIPTION OF THE DISCLOSURE

The present disclosure provides methods for further compressing data for transmission between an IMU and an AP within a device architecture including a serial connection between the AP and IMU, the IMU having a FIFO buffer for storing velocity and orientation increments obtained by strap down integration.

In an embodiment of the invention, the FIFO minimally contains the last velocity increment and orientation increment (i.e., an on-demand configuration). In a further embodiment of the invention, a user can opt to configure the IMU such that the last velocity and orientation increment is sent only on request of the AP, thereby reducing the information stream to what is absolutely necessary for the application. Each time the IMU is sampled, a small orientation/velocity increment is added to the existing orientation/velocity increment. After the buffer has been readout at the request of the AP, the SDI-values (velocity and orientation increments) are reset to zero.

Figure 2:
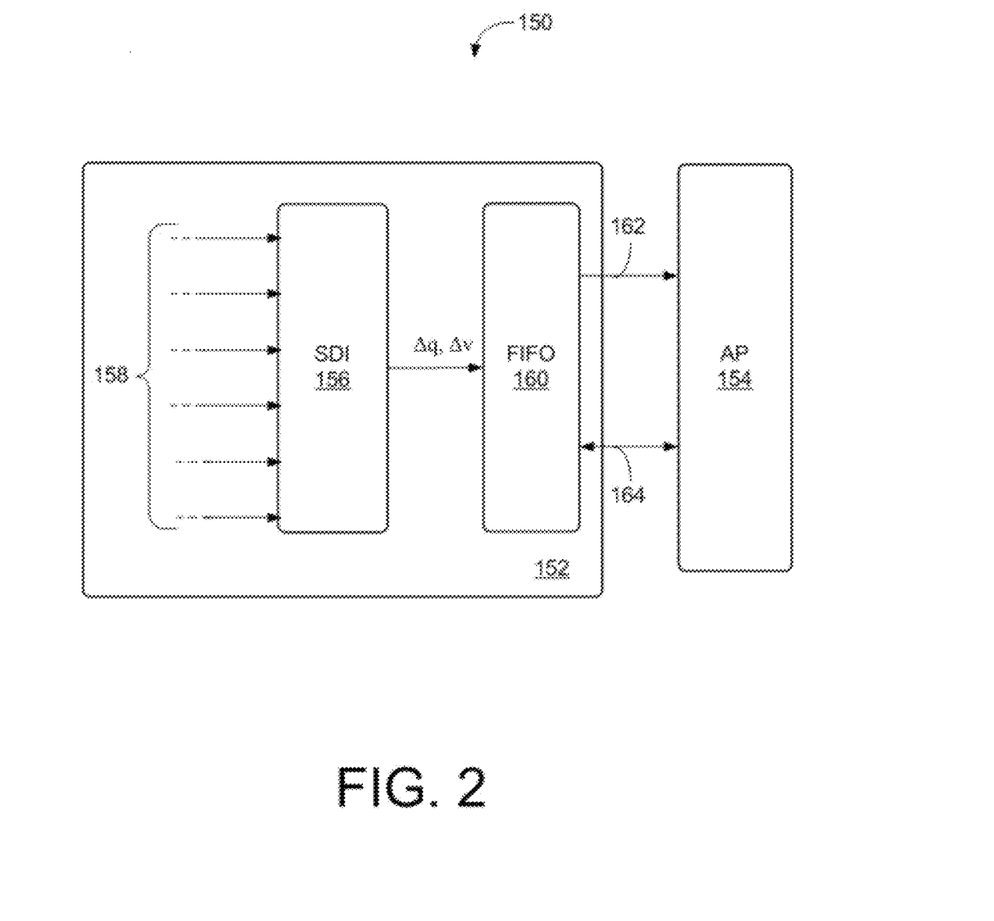
FIG. 2 is an exemplary architecture in keeping with the present disclosure including an IMU having a FIFO buffer, as well as an AP.

With above overview in mind, and turning now to FIG. 2, there is shown an exemplary architecture 150 in keeping with the present disclosure. The illustrated architecture 150 includes an IMU 152 and an AP 154. The IMU 152 in turn comprises an SDI unit 156 for receiving calibrated sensor data on inputs 158, e.g., from a calibration unit in communication with a plurality of accelerometers and gyroscopic sensors in a traditional manner.

The IMU 152 further includes a first in first out (FIFO) buffer 160. The FIFO buffer 160 receives velocity and orientation increments obtained by strap down integration from the SDI unit 156. The FIFO buffer 160 is in turn configured to serially transmit its contents to the AP 154 over serial link 162 (e.g. SPI, I2C). In particular, a bidirectional interrupt line 164 from the AP 154 to the FIFO buffer 160 is used to trigger transmission from the FIFO buffer 160 to the AP 154. The interrupt line 164 may be used to transmit an actual interrupt signal or may transmit a "clear to transmit" signal or the like. The technical implementation of a bi-directional interrupt line will be within the abilities of those of ordinary skill in the art, and can be done in any suitable manner.

As noted above, in the event of an imminent buffer overflow of the FIFO buffer 160, the oldest two velocity increments and orientation increments are combined via strap down integration in an embodiment of the invention. As a result, although one or more samples from specific moments are discarded, the resulting integrated orientation and velocity increment is maintained, albeit over a longer interval.

In a further embodiment of the invention, the FIFO buffer 160 contains at least the latest velocity increment and orientation increment (e.g., for an on-demand configuration). In this embodiment, a user can choose to configure the IMU 152 such that this latest velocity and orientation increment is sent only on request of the AP 154, thereby reducing the information stream over serial link 162 to what is absolutely necessary for the application running at the AP 154.

Each time the IMU 152 is sampled, a small orientation/velocity increment is added to the existing orientation/velocity increment. After the FIFO buffer 160 has been readout upon request of the AP 154, the SDI values (velocity and orientation increments) are reset to zero. This on-demand embodiment of the invention will be discussed in greater detail below.

Within the on-demand embodiment, there is no requirement to pre-configure an update rate at which data will be transmitted from the FIFO buffer 160 to the AP 154. Rather, the AP 154 determines when to request an SDI data-point from the FIFO buffer 160 without losing accuracy. In this embodiment further, a backtrack buffer may be implemented through which the overflow can be handled effectively without losing data.

The AP 154 is then able to request the SDI data at irregular intervals, e.g. when an update is required given the processor load, the application currently running and the real-time requirements. Issuing the request is implemented via the interrupt line 164 by the AP 154 sending an interrupt signal or other similar signal (e.g. a 'clear-to-send' indication). When the AP 154 asserts this line 164, the IMU 152 will transmit the SDI value at the end of the next frame, i.e. at the next integration step. This means that the IMU 152 will not react directly on the assertion of the interrupt line by the AP 154 since that could interfere with the precise sample timing at the IMU 152. Instead, the IMU 152 will check the level of the interrupt line at the frame transition. If the level of the interrupt line at the frame transition is high, the IMU 152 will transmit the calculated SDI value.

When not transmitting its SDI data, the IMU 152 continues to integrate thereby effectively increases the interval until the AP 154 requests the data. The transmitted value corresponds to the interval between the current time and the last time at which the AP 154 requested the SDI data.

In an embodiment of the invention, after assertion of the interrupt line 164 and once the IMU 152 has transmitted the SDI data to the AP 154, the IMU 152 pulls down (de-asserts) the interrupt line 164 at the frame transition. The reason for the IMU 152 to de-assert the interrupt line 164 specifically at the frame transition is to allow the AP 154 to capture this moment precisely in the AP's own timeframe. This can then be used, as mentioned below, to correlate the IMU with other data.

In addition, since the AP has information indicating the frame rate at the IMU 152 and how many frames are associated with the interval, other corrections could be implemented as well to cope with clock-errors, e.g., caused by a poor clock at the IMU 152. This eases the requirements for the clock at the IMU 152 and thereby reduces power consumption. The power savings occurs because precise clocks must be temperature compensated, which consumes power. While shared clocks could be used instead, this introduces additional complexity and costs. Regardless, the time corrections on the IMU data at the AP 154 should not counteract the calibrations done on the IMU itself.

It will be appreciated that the timing data is not available when the AP 154 keeps the interrupt line 164 high to have the IMU 152 transmit at the highest effective update rate as discussed above. However, the lack of timing information in this case will not create a problem as long as the clocks of the IMU 152 and AP 154 are correlated enough for the AP 154 to be able to determine the current frame at the IMU 152 given its own internal time. Similarly, the AP 154 need not capture the timestamp for each and every data-point received, since clock correlation algorithms can determine the timestamp of the received data-point.

Figure 3A:
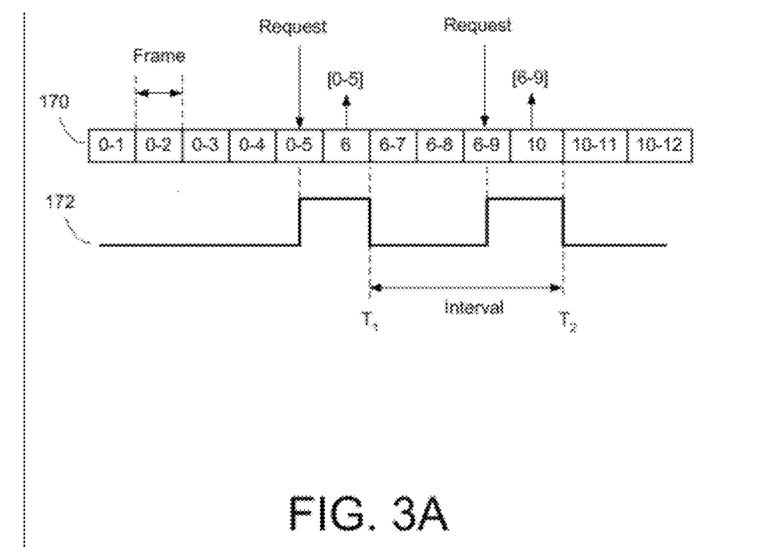
FIG. 3 is a schematic frame sequence diagram correlating the timing of assertion and de-assertion of the interrupt line with the SDI frame transmission and creation.

Continuing, an example of SDI data request timing is illustrated in the example of FIG. 3A. In particular, FIG. 3A is a schematic frame sequence diagram correlating the timing of assertion and de-assertion of the interrupt line 164 with the SDI frame transmission and creation.

From a starting point in time, the SDI unit generates sequential frames 170 incorporating data from sequential sample instances. Thus, the sequence of frames 170 begins with a frame containing the first two sample instances, and has become a frame incorporating the first six sample instances as of the time when the interrupt signal 172 is asserted. While the interrupt signal 172 is asserted, the SDI transmits a frame incorporating samples 0 through 5 and begins creation of frames [6-n]. At the start of the creation of the frame incorporating samples 6-7, the IMU 152 de-asserts the interrupt line at time $T_1$.

The interrupt signal 172 is again asserted by the AP 154 during creation of the [6-9] frame, after which the IMU 152 transmits the [6-9] frame and begins creation of frames [10-n]. At the start of the creation of the frame incorporating samples 10-11, the IMU 152 de-asserts the interrupt line at time $T_2$. Thus, while the update interval required by the AP 154 is $T_1$-$T_2$, the update rate of the IMU 152 is much quicker.

Regarding synchronization, the timestamp can be obtained in the ISR of the AP 154 and the SDI data can be read, for example, from its DMA channel. Using the timestamps, the AP 154 can correlate the SDI data with other sensor data in its own timeframe since the exact time of capture is known.

The transmission of the IMU 152 should be completed before the AP 154 issues a new request by re-asserting the interrupt line 164. This can be assured via appropriate hardware or software, i.e., to ensure that the interrupt line 164 cannot be asserted during an ongoing transmission.

As noted elsewhere herein, the AP 154 can keep the interrupt line 164 high and as a result the IMU 152 continues to send data. However, if the serial communication line 162 has too low of a data rate, such that a new value becomes available during the transmission of a current value, upcoming values will be buffered in the FIFO until the buffer is filled, at which point the mechanism of combining two elements is used as described elsewhere herein. This demonstrates the manner in which the described mechanism can be used to provide great freedom in choosing the data rate of the serial line, even during operation.

Figure 3B:
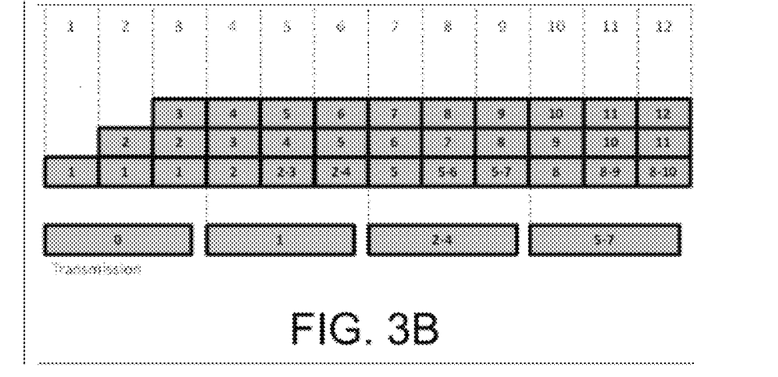

Consider a situation in which the AP 154 keeps the interrupt line 164 high and consequently the IMU 152 is continually transmitting the oldest element in the FIFO. Further, in this example, the FIFO can contain 3 elements and the transmission of a single value takes approximately 3 frames. This means that after 3 frames there is room for a new element. In FIG. 3b, the contents of the FIFO buffer and the ongoing transmission are illustrated for a number of consecutive frames. As can be seen from FIG. 3b, due to the combining of the two oldest elements when the buffer is full, the system automatically adjusts itself to the capabilities of the serial communication link in use by effectively lowering the rate at which the data is received. This benefit is achieved without requiring any additional hardware or logic whatsoever.

It will be appreciated that since the IMU 152 may be aware of an occasional high frequency event, i.e., an event that exhibits significant changes in sensed data at a rate much higher than the AP update rate, high frequency events may go unnoticed by the AP 154 in an on-demand update system unless precautions are taken. In this connection, in an embodiment of the invention, a prediction technique is applied at the AP 154 to decrease the update request interval when a high frequency event is anticipated.

Thus, for example, the AP 154 may keep the interrupt line 164 high through the anticipated event. As a result, the IMU 152 would continue sending the data, which is then stored in DMA. An example of a predictable event with respect to which this technique would apply is the periodic swaying of a skater. However, for unpredictable events, prediction is not as effective.

Figure 4:
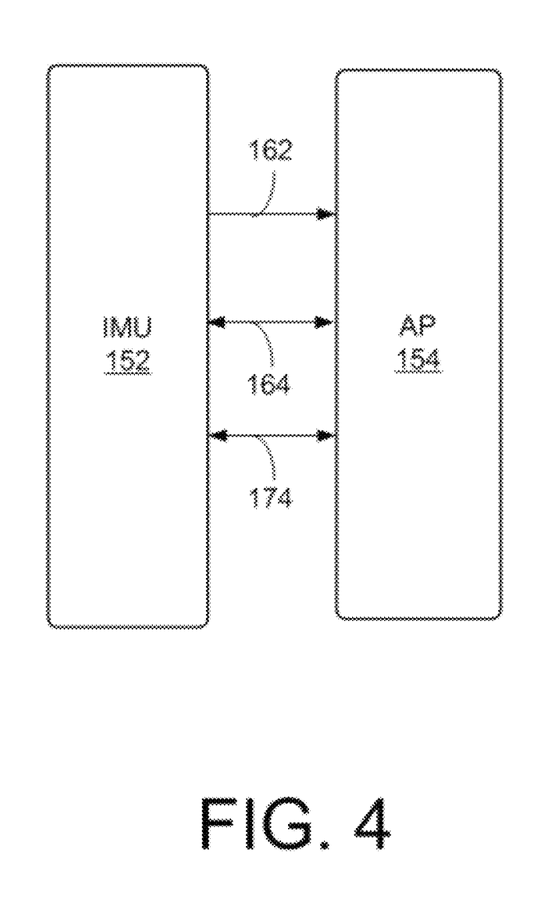
FIG. 4 is a schematic diagram of an alternative architecture wherein an additional line between the IMU and AP is employed to convey event detection information.

In order to allow the AP 154 to track both predictable and unpredictable events without permanently increasing the update rate, an event detection technique implements a buffer at the IMU 152 for use in combination with event detection technique. In this embodiment of the invention, the event detection occurs at the IMU 152. The detection of events may be based on changes in energy, sudden stops, sudden movements or accelerations, and so on. Upon detection of an event, the data sent by the IMU 152 to the AP 154 contains an indication that an event requiring a greater update rate has occurred. In an alternative embodiment of the invention, an additional line 174 between the IMU 152 and AP 154 is employed to convey event detection information as shown in FIG. 4.

As a result the AP 154 is apprised that the IMU 152 has identified an event by its own heuristics. The indication from the IMU 152 regarding event detection need not be robust, i.e., false-positives may temporarily increase bandwidth usage but otherwise are not harmful since the AP 154 will still perform a detailed analysis of the data generated by the IMU 152 during the event.

Because a detailed analysis of event data by the AP 154 will generally require analysis of intermediate data points, the IMU buffers these points in an embodiment of the invention. In a first embodiment of the invention the AP 154 is responsible for requesting the intermediate points if needed, whereas in a second embodiment of the invention the IMU 152 automatically send the intermediate points once it has detected an event. While either option is suitable, the first option may be preferred because the control of updating remains at the AP 154.

Figure 5:
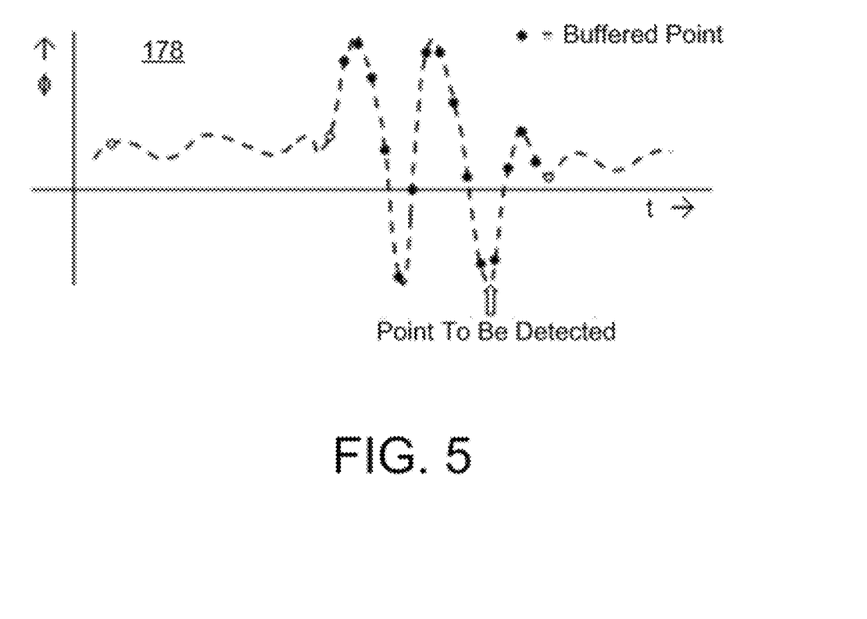
FIG. 5 is an example data curve showing buffering of all intermediate points between two consecutive AP data-requests.

In either case, the IMU 152 maintains the intermediate points in a backtrack buffer. To be more precise, in order to enable the AP 154 to precisely analyze the event, the AP 154 needs the intermediate points and therefore the IMU 152 must buffer all the intermediate points between two consecutive AP data-requests. This situation is exemplified by sample curve 178 in FIG. 5. In the illustrated sample curve 178, the open points represent updates routinely requested by the AP 154, whereas the solid points represent intermediate values that have been buffered. To implement retrieval of data in the backtrack buffer, the AP 154 sets the IMU 152 in a 'flushing' mode, e.g. using for the serial communication line, after the AP 154 receives the event detection indication from the IMU 152. In an embodiment of the invention, once the interrupt line is asserted, the IMU 152 simply starts transmitting all of the buffered data-points, starting with the oldest and ending with the last one after the assertion.

Figure 6:
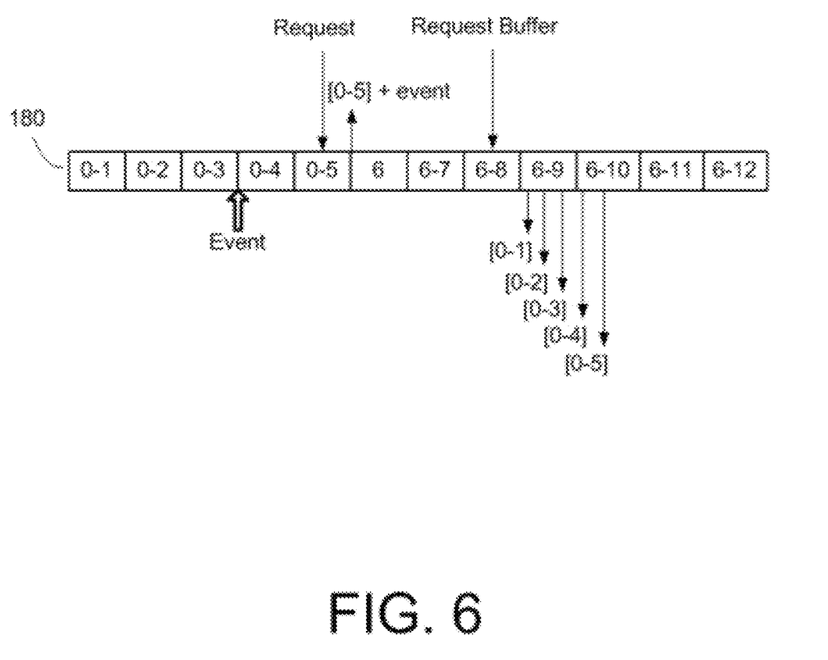
FIG. 6 is a simplified diagram of an exemplary frame stream including an event notification and buffer flush.

An exemplary frame stream including an event notification and buffer flush is shown in FIG. 6. The illustrated frame sequence 180 progresses through 12 samples, with an event being detected by the IMU 152 after the third sample. Pursuant to the next update request from the AP 154, the IMU 152 transmits the update data as well as an event notifier. In response to the event notifier, the AP 154 requests the backtrack buffer contents during the eighth sampling interval, and the buffer is flushed (including all points [0-1] through [0-5]) over the course of the next two sampling intervals. In the meantime all new data is stored in the backtrack buffer as well. In an embodiment of the invention, once a buffered element is transmitted, it is deleted from the buffer. Furthermore, it will be appreciated that with the foregoing technique, only the intermediate points between two data requests need to be buffered.

In the event that the interval between two consecutive data requests from the AP 154 becomes very large, it is possible for the backtrack buffer to become completely filled and overflow. However, instead of simply deleting a sample, for example deleting the oldest value as would ordinarily be done with a FIFO structure, the IMU 152 combines the two oldest values via strap down integration (accumulation) in an embodiment of the invention. This operation is illustrated schematically in FIG. 7.

Figure 7:
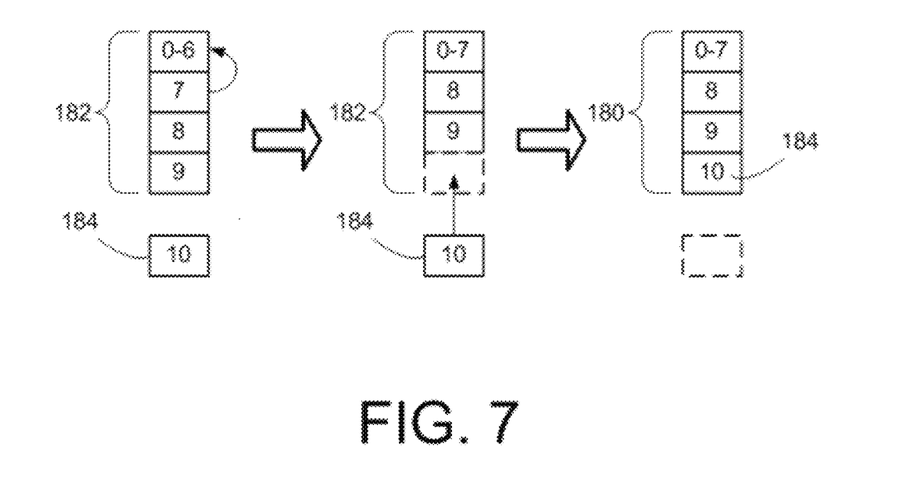
FIG. 7 is a buffer sequence diagram showing combining of the two oldest values via strap down integration in an embodiment of the invention.

In particular, the buffer 182 is illustrated as initially containing 4 SDI data sets, with the first being a combined set of SDI values, and the last three being the latest SDI values. In addition, a new SDI value 184 (10) is to be put into the buffer 182.

To accommodate the new SDI value 184, the oldest SDI value (the combined value) is combined with the next oldest value (SDI value 7) to create a new oldest value (0-7), and the new value 184 (10) is placed in the buffer in the space freed up by the combining step. This means that the last value in the buffer 182 holds one SDI value (delta orientation and delta velocity), albeit over a longer integration time. The advantage of this approach is that, although the exact data point in the time series is lost, the information of the motion itself is not lost since that information is now contained in the last data value in the buffer 180. This combination technique can be applied numerous times as needed until the buffer 180 is emptied by the AP 154.

While the foregoing architecture and techniques serve to conserve power by providing updates to the AP on demand as well as related functionality, there is a need in some application environments to further compress the data to be transmitted between the IMU and AP. For example, some applications require the IMU to stream inertial data at a relatively high update-rate. An example of this type of application environment is a sensored glove for finger-tracking as may be used in interactive gaming or virtual reality applications. In such a situation, high data-rates are required in order to be able to accurately capture fast movements such as when the user is playing a musical instrument like a piano or a guitar.

Such application scenarios would ordinarily require a large amount of data to be transmitted to the AP, which would conflict with low-cost and low-power consumption requirements. In addition to causing excess power consumption, such high data rates could push or exceed the fundamental limits of system performance. Although extreme accuracy may not be required in such situations, routinely allowing inaccuracy would typically lead to unacceptable integration drift.

In view of these issues, a lossy inertial data compression technique is provided in an embodiment of the invention. In this context, the adjective "lossy" denotes a transformation or process that loses data such that a direct reversal of the process to reproduce the exact starting values is not possible. The disclosed lossy inertial data compression technique introduces a coarser data resolution, but does so while preserving the integral value of the quantities of interest (motion increments) and thereby allowing routine loss of accuracy without increasing integration drift. Moreover, this solution can be efficiently implemented in low-power consumption devices, and can be used as a complement to loss-less compression schemes.

Figure 8:
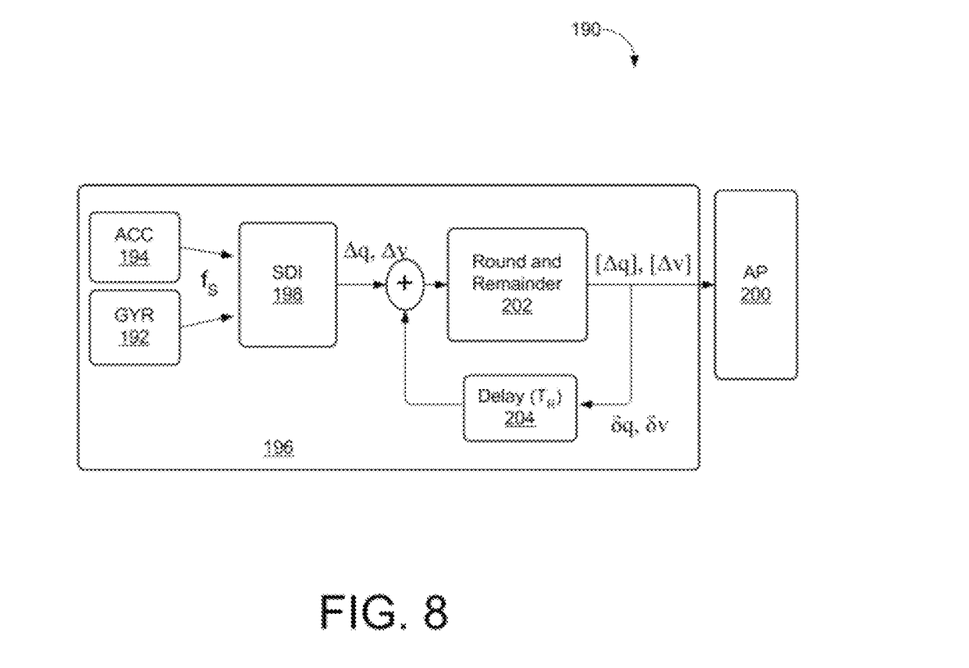
FIG. 8 is a schematic diagram showing a motion increments rounding and remainders feedback data compression system.

FIG. 8 is a schematic diagram showing the motion increments rounding and remainders feedback data compression system 190. In operation, the analog signals from 3D gyroscopes (192) and 3D accelerometers (194) of the IMU 196 are digitized into angular velocity and acceleration samples. The sample frequency $f_S$ may range from about 100 Hz for damped human movement up to 30 kHz for systems that must track impacts and/or vibrations.

The resultant angular velocity and acceleration samples are mathematically integrated to angle increments ($\Delta q$) and velocity increments ($\Delta v$) via SDI module 198, compensating for coning and sculling. The output frequency $f_R$ may range from 0.01 Hz for pedestrian navigation applications to 400 Hz for highly dynamic situations. To preserve accuracy, the angle increments ($\Delta q$) and velocity increments ($\Delta v$) are streamed with a large number of bits for high resolution (typically between 16 and 32 bits).

While this large number of bits allows for high accuracy, it would also require significant bandwidth and power usage to transmit the data in this form. To reduce the amount of data which needs to be transmitted to the Application Processor (AP 200), the angle and velocity increments Δq and Δv are rounded at rounding module 202 to a much lower number of bits of resolution (e.g., between 4 and 16 bits). The low-bit rounded values designated [Δq] and [Δv] are then transmitted to the AP 200 in lieu of the high-bit angle and velocity increments Δq and Δv.

The rounding of the angle and velocity increments Δq and Δv produces remainder values δq and δv respectively, which are fed back through delay module 204 to be summed with the next angle and velocity increments Δq and Δv prior to rounding. The delay module 204 delays the rounding remainders by one output sample period ($T_R = 1/f_R$) prior to releasing them to be summed with the new incoming angle and velocity increments. In this way, new angle and velocity increments, which include the previous rounding remainders, are created, and the rounding error is not accumulated. As such, the lower number of bits used to stream data to the AP 200 only results in decreased motion resolution, but does not degrade integral accuracy.

An analytical formulation of the motion increments rounding and remainders feedback scheme is given hereinafter to allow the reader to more fully appreciate the operation and benefits of the system. It will be seen that the proposed compression strategy requires only modest additional operations and can therefore be efficiently employed in low-cost and low-power consumption devices.

For the sake of conciseness, this example will limit itself to the calculation of the angle increments. Moreover, the problem is formulated using quaternion arithmetics, however, other formulations can be used, without limiting the scope of the example. The rounded angle increments can be calculated as:

$$[\Delta q] = \text{round}(\Delta q \, 2^{(Nq-1)})/2^{(Nq-1)}$$

Where Nq is the number of quantization bits, "round" is the standard rounding operation, and Δq is the quaternion representation of the angle increment Δα, defined as:

$$\Delta q = [\cos(\Delta\alpha/2), c1 \sin(\Delta\alpha/2), c2 \sin(\Delta\alpha/2), c3 \sin(\Delta\alpha/2)]$$

The values c1, c2, c3 are known by those of skill in the art as direction cosines.

Since any arbitrary rotation increment can be represented with a quaternion Δq with elements in [−1,1), the elements in [Δq] can be quantized on Nq bits with a resolution of $2^{(Nq-1)}$. Note that additional optimization can be performed; for example, using the unit norm quaternion property, only three elements of Δq fully define the rotation increment and therefore need to be transmitted. Additionally, assumptions on maximum possible angle increment in a single transmission period would further decrease the minimum number of bits necessary to have the same angle resolution. These optimizations are straightforward and are consequently not addressed here in detail.

Given the above, the angle increment rounding remainder can therefore be calculated as:

$$\delta q = \text{inv}([\Delta q]) * \Delta q$$

where the symbol * represents the quaternion multiplication and "inv" is the inverse quaternion operation.

Similarly, the summation operation in IMU 196 is a quaternion multiplication as follows:

$$\Delta q = D(\delta q) * \Delta q$$

where D(δq) is the angle increment rounding remainder delayed by one output sample period $T_R$.

Figure 9:
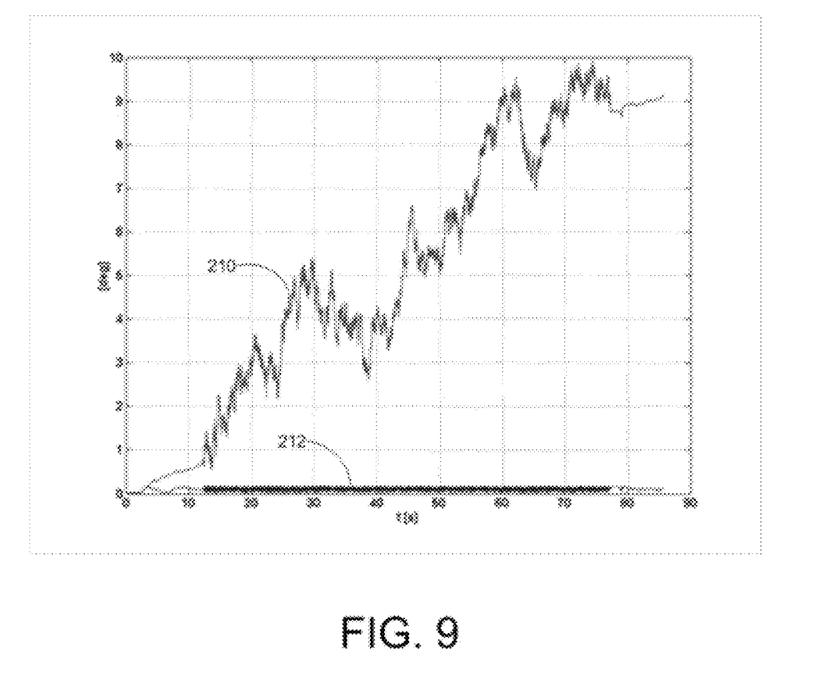
FIG. 9 is a plot showing orientation angle error with respect to time, for the angle error obtained with a traditional quantization method and the angle error obtained with the rounding and remainder feedback compression technique according to an embodiment of the invention.

The performance of the described technique compares favorably with quantization techniques routinely used in the art. In this regard, FIG. 9 is a plot showing orientation angle error with respect to time, for the angle error 210 obtained with a traditional quantization method and the angle error 212 obtained with the rounding and remainder feedback compression technique described herein for 10 bits of resolution and 100 Hz output rate. As can be seen, the quantization introduces orientation drift which increases over time, up to about 10 degrees in one minute. In contrast, the orientation angle error 212 using the compression technique described herein introduces a coarser angle resolution of a fraction of degree, but unlike the traditional orientation error 210, the orientation error 212 does not increase over time.

In an experiment using only 8 bits of quantization, the traditional quantization method shows an orientation error of up to 50 degrees in one minute, whereas the method described herein shows a coarser resolution of about 0.5 degree, but the error does not increase over time. As such, it can be seen that the described method maximizes the efficient use of available transmission resources while simultaneously providing resolution accuracy without introducing any motion integration drift.

In general, angle and velocity increments will be statistically distributed around small values, rather than exhibiting maximum scale range. This is typical of inertial sensor measures; for example, with respect to accelerometers, the maximum range of these devices for human applications is usually between 8 and 16 g to guarantee robustness towards short high dynamics transients (e.g. impacts). However, human movements cannot generate these excitations for more than a few milliseconds.

Therefore, in an embodiment of the invention, a variable step quantization approach is employed in combination with the above rounding and remainders feedback compression scheme. In this embodiment, motion increments are rounded around small values with a fine resolution, but are rounded with a coarser resolution around larger values. In this way, the occasional coarser resolution occurring during short high dynamics transients only creates a momentary increase in quantization error, but does not cause any increasing motion drift. In human applications, this larger quantization error during high dynamic movements would generally be largely imperceptible. In contrast, if this variable step quantization approach were used with traditional quantization methods, the occasional coarse resolution during high dynamics would introduce a cumulative drift error which would affect the overall accuracy during the following low dynamic motions.

In an embodiment of the invention, this approach is alternatively implemented by means of a signal pre-conditioning transformation (i.e. an invertible function y=T(x) applied to the original increments). Through a transformation curve (e.g. hyperbolic, polynomial, etc.) the values of the motion increments are compressed close to the end-scale range, allowing an effective variable step quantization on the original increments.

As noted in passing above, the lossy compression technique described herein only exploits the fact that, with proper increments remainder feedback, the integral quantities of interest are preserved. Therefore, typical statistical properties of the motion increments are not directly used to achieve a data compression gain. However, in an alternative embodiment, two loss-less complementary compression techniques are used together with the described rounding and remainders feedback compression strategy.

As regards the first of these, an additional mapping of the rounded increments ([Δq], [Δv] is performed before transmission to the AP 154 using variable length coding, e.g. Huffman or LZW codes. Such codes, which are familiar to those of skill in the art, essentially achieve a compression gain by using a smaller number of bits to code symbols which occur more often. This solution can be implemented with a look-up table for example, and it is fully transparent in the sense that it can be applied on top of the previously described techniques. Moreover, this method is especially beneficial when the minimum possible use of transmission resources is a primary consideration as is the case often with respect to wireless transmission.

As regards the second of the two loss-less complementary compression techniques, with relatively high output sample rates $f_R$ compared to the motion dynamics bandwidth, motion increments are strongly correlated in time. Therefore, a predicative algorithm can be implemented by the IMU 152 as briefly discussed earlier. Thus, for example, in an embodiment the prediction step calculates an estimate of the current increment using the previous motion history. The IMU then only sends the difference between the original and the predicted motion increment. The difference is transmitted on a small number of bits of resolution. Upon receipt, the AP 154 reconstructs the original motion increment by applying the same prediction algorithm.

In an embodiment, the described method is employed to handle a very large range of delta_velocities (delta_v) without requiring a high-bit numerical representation. This provides a high level of robustness against the occurrence of numerical overflows in very low output rate scenarios. This is beneficial in the case of delta_v wherein the computed quantity grows large with larger sample rates. In an embodiment for use in semi-static or very low dynamic situations, dv will continue integrating the gravity force.

When using quantization, although a fine resolution per se would be not required by the application, it may still be needed in order to preserve sufficient integral accuracy. This fact will limit the maximum time duration over which dv can be integrated before occurrence of overflow, due to its limited numeric range of representation, for the given number of bits. This problem is prevented with the described techniques. Indeed, the quantization resolution can be flexibly chosen to match the specific application requirements for the maximum duration of integration (output update rate).

In summary and overview, the described novel architecture, in combination with the optional enhancements as discussed above as desired, provides an IMU/AP system that allows for minimum power usage for data communications between the IMU and AP. This may be useful in any type of device but is most beneficial in power-constrained mobile consumer devices such as smart phones and similar devices, as well as other self-contained tracking units, as may be employed to track shipments or personnel. While only certain examples of the described system and method have been set forth, alternatives and modifications will be apparent from the above description to those skilled in the art.

What is claimed is:

1. A method for data compression in a motion sensing device having an inertial measurement unit with a strap down integration unit and an application processing unit, the method comprising:
   generating a first velocity increment and a first orientation increment at the inertial measurement unit;
   rounding the first velocity increment and first orientation increment at the inertial measurement unit, thereby producing a first remainder velocity value and a first remainder orientation value, wherein the step of rounding each velocity increment and orientation increment reduces its bit count from a first bit count to a second lower bit count;
   combining the first remainder velocity value and the first remainder orientation value with a second velocity increment and a second orientation increment respectively at the inertial measurement unit; and
   repeating the rounding and combining steps for subsequent velocity and orientation increments at the inertial measurement unit.

2. The method for data compression in accordance with claim 1, wherein each velocity increment and orientation increment is produced by digitizing and integrating accelerometer and gyroscope signals respectively.

3. The method for data compression in accordance with claim 1, further comprising delaying the remainder values by one output sample period prior to the step of combining.

4. The method for data compression in accordance with claim 1, wherein the first bit count is in the range of between 16 and 32 bits and the second lower bit count is in the range of between 4 and 16 bits.

5. The method for data compression in accordance with claim 1, further comprising applying a signal pre-conditioning transformation to motion increments, the signal pre-conditioning transformation applying a transformation curve such that the values of the motion increments are variably compressed according to the curve.

6. The method for data compression in accordance with claim 1, further comprising applying a mapping of rounded increments using variable length coding at the inertial measurement unit.

7. The method for data compression in accordance with claim 1, further comprising applying a predicative algorithm to the rounded values at the inertial measurement unit.

8. The method for data compression in accordance with claim 1, wherein the step of rounding includes a variable quantization step.

9. The method for data compression in accordance with claim 8, wherein the variable quantization step rounds smaller increments with a finer resolution than larger increments.

* * * * *